us012393555B2

(12) United States Patent
Gupte et al.

(10) Patent No.: US 12,393,555 B2
(45) Date of Patent: Aug. 19, 2025

(54) SCALING AND DISTRIBUTING NAMESPACES AND CLIENTS ACROSS MULTIPLE FILE SYSTEM REDIRECTOR PROXIES

(71) Applicant: Dell Products L.P., Round Rock, TX (US)

(72) Inventors: Poornima Gupte, Pune (IN); George Mathew, Belmont, CA (US); Viral Kirtikumar Mehta, JamKhambhalia (IN); Omkar Anand Ekbote, Pune (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/417,267

(22) Filed: Jan. 19, 2024

(65) Prior Publication Data

US 2025/0238402 A1   Jul. 24, 2025

(51) Int. Cl.
G06F 16/182   (2019.01)
G06F 9/54     (2006.01)

(52) U.S. Cl.
CPC ............ *G06F 16/183* (2019.01); *G06F 9/542* (2013.01)

(58) Field of Classification Search
None
See application file for complete search history.

(56) References Cited

U.S. PATENT DOCUMENTS

| | | | |
|---|---|---|---|
| 11,973,823 B1* | 4/2024 | Ghorpade | ........... H04L 67/1097 |
| 12,229,017 B2* | 2/2025 | Shilane | ............... G06F 11/1458 |
| 2016/0041882 A1 | 2/2016 | Kruse et al. | |
| 2019/0332495 A1 | 10/2019 | Fair et al. | |

FOREIGN PATENT DOCUMENTS

JP   2021089625 A   6/2021

* cited by examiner

*Primary Examiner* — Thu N Nguyen
(74) *Attorney, Agent, or Firm* — Chamberlain, Hrdlicka, White, Williams & Aughtry; Aly Z. Dossa

(57) ABSTRACT

One or more embodiments of the invention relates to a method of managing data in a cluster. The method includes receiving, by a global event manager of the cluster, a notification that an event has occurred on the cluster, wherein the cluster comprises a plurality of file system redirector proxy (FSRP) nodes. In response to the notification, the global event manager performs a load balancing analysis on the cluster to assign an export location of a file system export to a FSRP node of the plurality of FSRP nodes, and notifying each of the plurality of FSRP nodes in the cluster of the event, wherein the notifying results in an update of a global export table of each of the plurality of FSRP nodes of the assigning of the export location to the FSRP node.

20 Claims, 10 Drawing Sheets

SCALING AND DISTRIBUTING NAMESPACES AND CLIENTS ACROSS MULTIPLE FILE SYSTEM REDIRECTOR PROXIES

BACKGROUND

In an enterprise environment, clustering is frequently used. One version of clustering, failover clustering, allows for a plurality of nodes to work together to increase the availability and scalability of the nodes. Further, one version of clustering provides file system data storage for clients. This version may include a hierarchy of nodes each with a designated function for the servicing of file system data storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
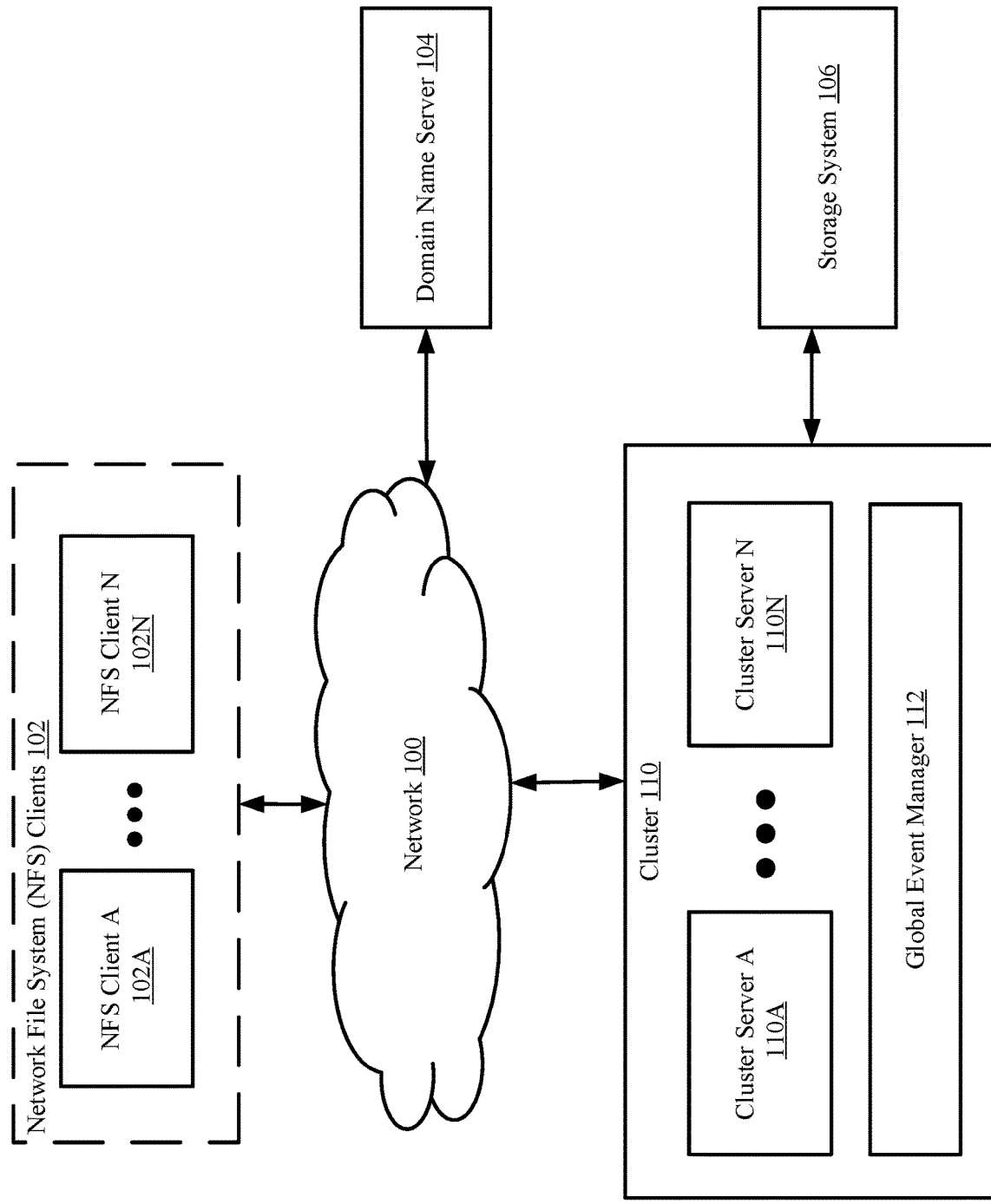
FIG. 1A shows a diagram of a system including a cluster in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regards to any other figure. For brevity, descriptions of these components will not be repeated with regards to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of the figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to system and methods for managing one or more file systems. More specifically, embodiments of the invention relate to a system that includes clients that operates its file system in a first protocol (e.g., a version of network file system (NFS)) and further includes a cluster that obtains input/output (I/O) requests in accordance with the first protocol and provides translation services of the obtained I/O requests into a second protocol readable to other nodes in the cluster. The cluster may include an enhanced file system redirector proxy (FSRP) node (also referred to as a FSRP node) that includes functionality for translating the I/O requests from the first protocol to the second protocol before transmitting the translated requests to the other nodes for processing in accordance with the second protocol.

Embodiments of the invention include methods for managing the distribution of workloads between the FSRP nodes in the cluster. Specifically, a namespace of NFS exports may be distributed across the FSRP nodes such that each FSRP node manages a portion of the namespace. The assigned exports (also referred to as NFS exports or file system exports) may be distributed based on even distribution of the file system exports across the FSRPs. Alternatively, the exports may be distributed based on client workload.

Embodiments of the invention further include managing the scaling of the FSRP nodes by using a global event manager that monitors events that occur in the cluster, such as a FSRP node going up or going down. Based on the changes to the FSRP nodes, the global event manager may initiate the update of a global export table managed by each FSRP node to specify the most current distribution of the exports between the FSRP nodes.

FIG. 1A shows a diagram of a system in accordance with one or more embodiments of the invention. The system may include one or more NFS Clients (102), a domain name server (104), a storage system (106), and at least one data cluster (110). The system may include any number of data clusters (110) without departing from the invention. For example, the system may include two data clusters (not shown) that communicate through a network (100). The system may include additional, fewer, and/or other components without departing from the invention. Each of the components in the system may be operatively connected via any combination of wireless and/or wired networks (100).

In one or more embodiments, the domain name server (DNS) (104) includes the functionality to store and report the IP address of all FSRP node servers in the cluster. The DNS helps the NFS Client identify the correct location for file system exports on the FSRPs in the cluster. The functionality of the DNS can be seen in FIG. 2A, where the NFS Client obtains, from the DNS, a list of the domain names for all FSRPs in the cluster. Additional details for the functionality of the DNS may be found, for example, in FIG. 2A.

In one or more embodiments of the invention, the cluster (110) may include a plurality of cluster servers (e.g., 110A, 110N) and a global event manager (114) without departing from the invention. The cluster may include any number of cluster servers (110A, 110N). For example, the cluster (110) may include two cluster servers (110A, 110N) that communicate through an internal network or by other means. The system may include additional, fewer, and/or other components without departing from the invention. Each of the components of the cluster may be operatively connected via any combination of wireless and/or wired networks (100).

In one or more embodiments of the invention, the cluster (110) includes the functionality to provide data protection services to the NFS Clients (102). The data protection services may include storage of data using deduplication operations such that only unique data is stored in the storage system (106). In this manner, the cluster (110) may be a deduplication-aware cluster. The cluster servers (110A, 110N) may include the functionality to provide and/or obtain other and/or additional services without departing from the invention. While FIG. 1A shows the cluster (110) as a separate component from the storage system (106), it can be a part of the cluster (110) without departing from the invention.

In one or more embodiments, the cluster servers (110A, 110N) include functionality for obtaining requests from the NFS Clients (102A, 102N) associated with files in a file system. The requests may be, for example, read or write requests. The requests may be in accordance with a version of a network file system (NFS) protocol. For example, the requests may be NFSv4 requests. The requests may specify writing new files, mounting a directory (or other files), reading new files, and/or other instructions without departing from the invention. The requests may be serviced using data stored in the storage system (106). For example, the cluster servers (110A, 110N), in response to obtaining the requests, may access the storage system (106) to read, write, and/or store data associated with the requests.

In one or more embodiments, the cluster (110) may include a second protocol for accessing data in the storage system (106). For example, a node in the cluster server (110) may operate in a protocol that is different from the NFS protocol of the NFS Clients (100). The second protocol may be, for example, Data Domain Boost (DDBoost™). In this manner, the cluster servers (110A, 110N) include nodes (discussed in FIG. 1B) that include functionality for translating the requests (in the NFS protocol) to cluster-readable requests (e.g., in the DDBoost™ protocol) and servicing the cluster-readable requests in accordance with the NFS requests. The translation and the servicing may be performed in accordance with any other methods without departing from the invention.

Figure 4:
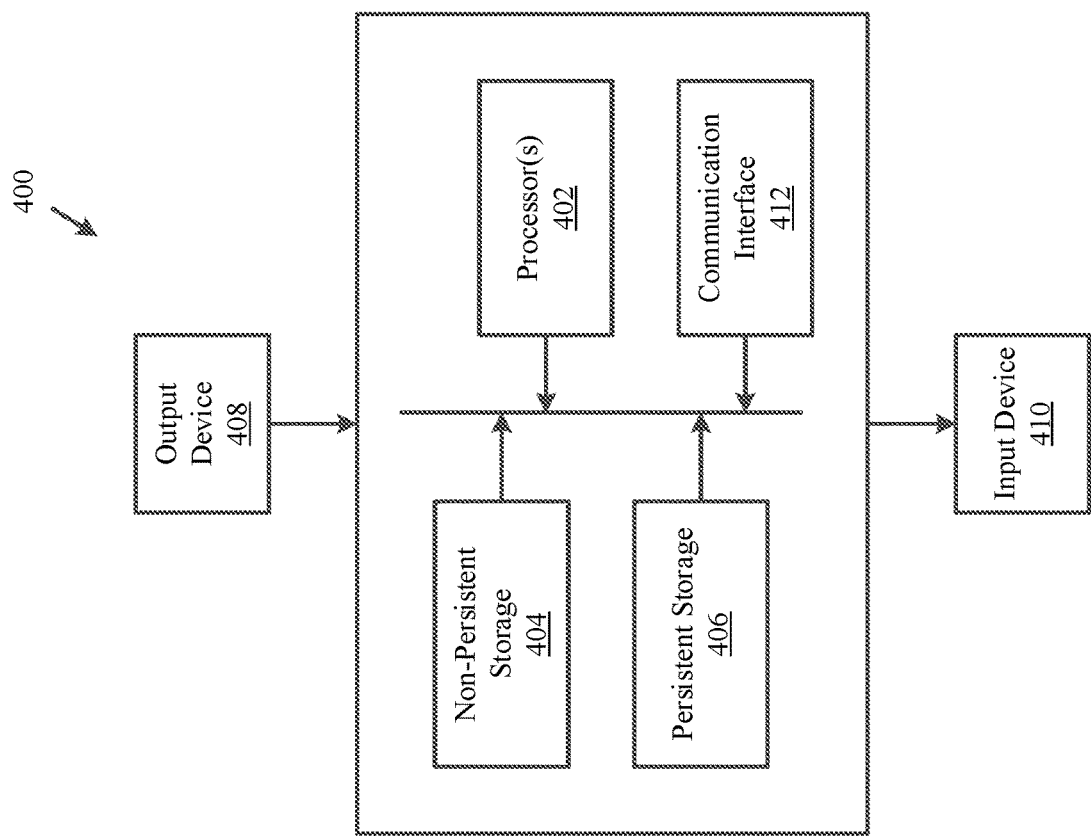
FIG. 4 shows a diagram of a computing device in accordance with one or more embodiments of the invention.

In one or more embodiments of the invention, each cluster server (110) is implemented as a computing device (see e.g., FIG. 4). The computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, it will cause the computing device to perform the functionality of the cluster server (110A, 110N) as described throughout this application.

In one or more embodiments, the cluster (110) further includes a global event manager (112) which maintains a list of all FSRP nodes in the system and the respective status and availability. It monitors each FSRP node (described in FIGS. 1B-1C) in the cluster. The global event manager (112) may be updated when any activity occurs in the system in order to maintain this list of FSRP nodes, as seen in the methodology of FIG. 2B. Specifically, when a change in the FSRP nodes in the clusters is detected, the global event manager (112) may initiate the update of a global export table (further described below). Examples of changes may include a FSRP node going UP or going DOWN. In one or more embodiments, if an FSRP node is "UP," this relates to the FSRP node becoming available and being introduced to the cluster. The FSRP node going UP may provide the computing resources to manage another export in the file system. If a FSRP node is "DOWN," this relates to the FSRP node becoming unavailable and, as such, is not able to manage any file system export. The unavailability may be caused by, for example, no available computing resources used for the FSRP node, the FSRP node is asleep, or the FSRP node has otherwise failed. The global event manager (112) may communicate directly with local event managers (discussed in FIG. 1B) in order to ensure that all FSRP nodes are aware of the node availability on all cluster servers (110A, 110N) in the cluster (110).

In one or more embodiments of the invention, the global event manager (112) is implemented as a computing device. A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device causes the computing device to perform the functionality of a global event manager (112) as described throughout this application.

In one or more embodiments of the invention, the global event manager (112) is implemented as a logical device. The logical device may utilize the computing resources of any number of computing devices and thereby provide the functionality of the global event manager (112) as described throughout this application.

In one or more embodiments of the invention, the cluster (110) works with a storage system (106) to store files and mapping information. The storage system (106) can comprise of local storage/volumes that are stored in any of the local storage devices of the storage system (106) or the nodes (See FIG. 1B) in the cluster (110). In one or more embodiments of the invention, the storage system (106) can comprise of storage that is not part of the cluster (110). Storage system (106) can also comprise of off-site storage including, but not limited to, cloud base storage and long-term storage such as tape drives, depending on the particular needs of the user and/or the system. The storage system (106) may include one or more processors, memory (e.g., random access memory) and persistent storage (e.g., disk drives, solid state drives, etc.).

In one or more embodiments of the invention, the storage system (106) includes the functionality to provide storage services to the cluster (110) as discussed above. The storage services may include (i) obtaining requests for data generated through the performance of computer implemented services from the cluster (110), (ii) storing data and metadata associated with the files in persistent storage of the storage system (106), and (iii) providing files to the cluster (110A, 110N) for read/write purposes and/or other purposes without departing from the invention. The storage services may include the functionality to provide and/or obtain other services without departing from the invention. The storage system (106) may include any number of storage devices without departing from the invention.

In one or more embodiments of the invention, the storage system (106) is implemented as a computing device. A computing device may be, for example, a mobile phone, tablet computer, laptop computer, desktop computer, server, distributed computing system, or cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device it causes the computing device to perform the functionality of a storage system (106) as described throughout this application.

In one or more embodiments of the invention, the storage system (106) is implemented as a logical device. The logical device may utilize the computing resources of any number of computing devices and thereby provide the functionality of the storage system (106) as described throughout this application.

In one or more embodiments of the invention the NFS Clients (110) and storage system (106), communicate with the cluster (110) through a network (100). The network (100) can take any form of network including any combination of wireless and/or wired networks. The network (100) can be a local network (LAN) or a wide area network (WLAN) including the Internet or a private enterprise network that connects more than one location. The network (100) can be any combination of the above networks, other known network, or any combination of network types.

In one or more embodiments of the invention, the network (100) allows the cluster (110) to communicate with other clusters (not shown) and external computing devices such as (but not limited to) a domain name server (e.g., 104) and backup storage (e.g., 106). The various components of the cluster (110) may also communicate with each other through a network. The network may be a high-speed internal network and/or include part of an external network (108).

A network (e.g., network (100)) may refer to an entire network or any portion thereof (e.g., a logical portion of the devices within a topology of devices). A network may include a data center network, wide area network, local area network, wireless network, cellular phone network, and/or any other suitable network that facilitates the exchange of information from one part of the network to another. A network may be located at a single physical location or be distributed at any number of physical sites. In one or more embodiments, a network may be coupled with or overlap, at least in part, with the Internet.

In one or more embodiments, although shown separately in FIG. 1A, the network (100) may include any number of devices within any components (e.g., 102, 104, 110, and 106) of the system, as well as devices external to or between such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces which may provide connections (i.e., links) to other devices (e.g., computing devices, other network devices, etc.). In one or more embodiments, a network device also includes any number of additional components (not shown) such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, router, multilayer switch, fibre channel device, an InfiniBand® device, etc. A network device is not limited to the aforementioned specific examples.

In one or more embodiments of the invention, a cluster (e.g., 110) may be implemented as one or more computing devices. A data cluster (e.g., (110)) may include any number of computing devices without departing from the invention. The data cluster (e.g., 110) may include different numbers of computing devices, quantity, and types of computer resources, and may perform different computer implemented services without departing from the invention.

Figure 1B:
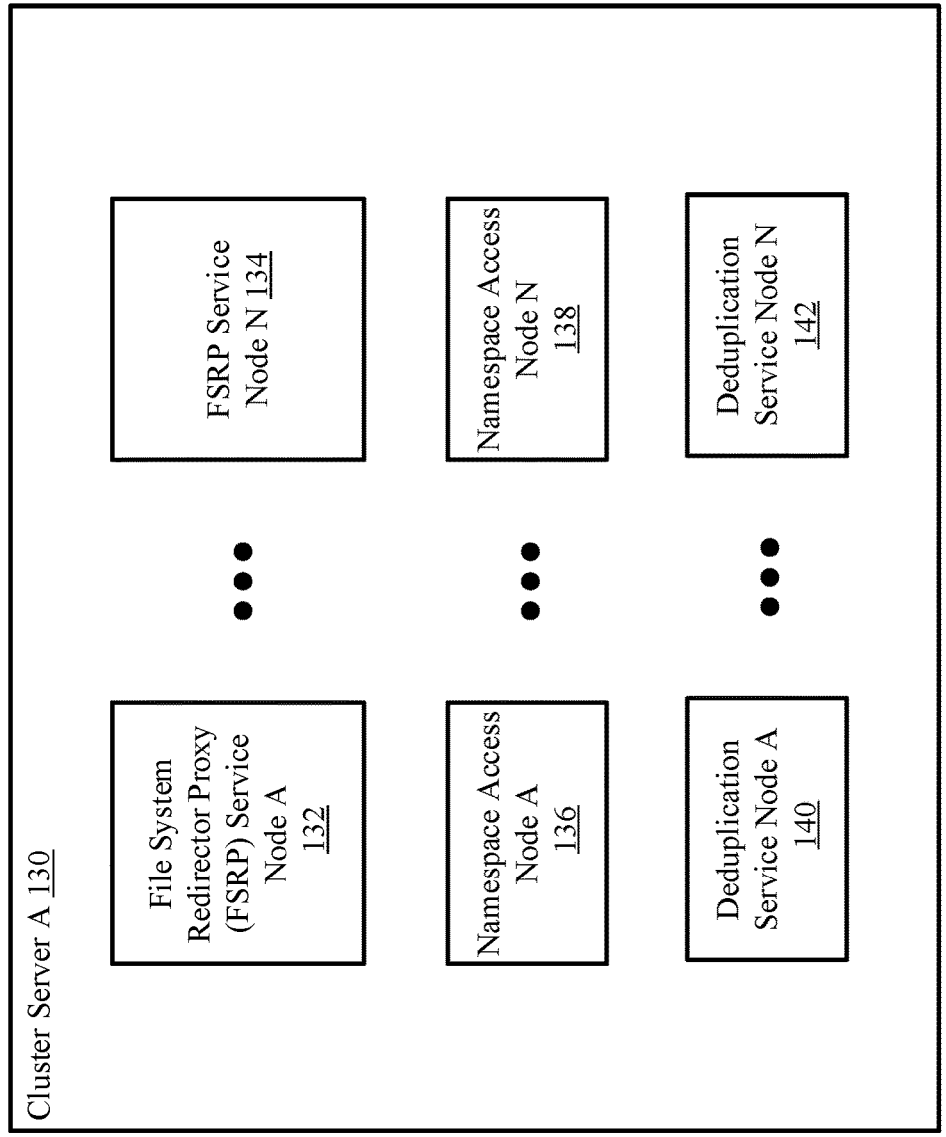
FIG. 1B shows a diagram of a cluster server in accordance with one or more embodiments of the invention.

FIG. 1B shows a diagram of a cluster server in accordance with one or more embodiments of the invention. The cluster server (130) of FIG. 1B may be an embodiment of a cluster server (110, 112, FIG. 1A) discussed above. The cluster server (130) may include one or more file system redirector proxy (FSRP) nodes (132, 134), one or more namespace access nodes (136, 138), and one or more deduplication service nodes (140, 142). Collectively, the enhanced FSRP nodes (132, 134), the namespace nodes (136, 138), and the deduplication service nodes (140, 142) may be referred to as cluster nodes of a cluster (e.g., 110, FIG. 1A).

While the cluster server (130) is illustrated as including cluster nodes such as enhanced FSRP nodes (132, 134), namespace access nodes (136, 138), and deduplication service nodes (140, 142), the cluster server (130) may only include one of these cluster nodes, additional cluster nodes, and/or different cluster nodes without departing from the invention.

In one or more embodiments of the invention, the cluster nodes perform workloads and provide services to clients and/or other entities not shown in the system illustrated in FIG. 1A. The cluster nodes may further include the functionality to perform computer implemented services for users (e.g., NFS Clients, 102, FIG. 1A) of the cluster (110). The computer implemented services may include, for example, database services, electronic mail services, data processing services, etc. The computer implemented services may include other and/or additional types of services without departing from the invention.

During the performance of the aforementioned services, data may be generated and/or otherwise obtained. The cluster nodes include local storage (not shown) which may include multiple volumes, as well as shared storage which may include cluster shared volumes (not shown). The data storage services may include other and/or additional services without departing from the invention. The data generated and stored on the shared storages by the cluster nodes may be valuable to users of the system and therefore may be protected.

In one or more embodiments, the FSRP nodes (132,134) of the cluster nodes include functionality for obtaining NFS requests from the NFS Clients (102, FIG. 1A) and translating the requests into cluster-readable requests for processing by the namespace access nodes (136, 138) and the deduplication service nodes (140, 142). For additional details regarding the FSRP nodes, see e.g., FIG. 1C.

In one or more embodiments of the invention, one or more of the FSRP nodes (132, 134) are each implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the FSRP nodes (132, 134) described in this application.

The FSRP nodes (132, 134) may each be implemented as a logical device without departing from the invention. The logical device utilizes computing resources of any number of physical computing devices to provide the functionality of the enhanced FSRP nodes (132, 134) described throughout this application.

In one or more embodiments, the namespace access nodes (136, 138) are each assigned a portion of the file system to manage. For example, each access node is assigned one or more objects (e.g., a directory, a document, a file, a drive, etc.) of the file system such that all namespace access nodes (136, 138) in a cluster (e.g., 110, FIG. 1A) collectively are assigned to all objects in a file system. The assignment of objects may be performed, for example, by one or more of the enhanced FSRP nodes (132, 134).

In one or more embodiments of the invention, one or more of the namespace access nodes (136, 138) are each implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the namespace access nodes (136, 138) described in this application.

The namespace access nodes (136, 138) may each be implemented as a logical device without departing from the invention. The logical device utilizes computing resources of any number of physical computing devices to provide the functionality of the namespace access nodes (136, 138) described throughout this application.

In one or more embodiments, the deduplication service nodes (140, 142) include functionality for performing data storage services. The data storage services may include, for example, deduplication services. The deduplication services may include hashing an object (or the data or portion of data associated therein) to obtain a unique identifier of the object and/or data and/or portion of data. The unique identifier is compared to a table managed by the deduplication service node (140, 142) to determine if such object is stored in a storage system (e.g., 106, FIG. 1A). In this manner, duplicates of data are not stored and the storage resources of the storage system are made efficient.

In one or more embodiments of the invention, one or more of the deduplication service nodes (140, 142) are each implemented as a computing device (see, e.g., FIG. 4). The computing device may be, for example, a mobile phone, tablet computer, laptop computer, desktop computer, server, or cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the deduplication service nodes (140, 142) described in this application.

The deduplication service nodes (140, 142) may each be implemented as a logical device without departing from the invention. The logical device utilizes computing resources of any number of physical computing devices to provide the functionality of the deduplication service nodes (140, 142) described throughout this application.

In one or more embodiments of the invention, the cluster nodes include local storage which are associated with only their assigned data node. The storage also includes shared storage such as a cluster shared volume (CSV). The storage may also include other types of shared volumes including active-passive shared volumes which only provide data storage services to the cluster nodes they are active on.

Figure 1C:
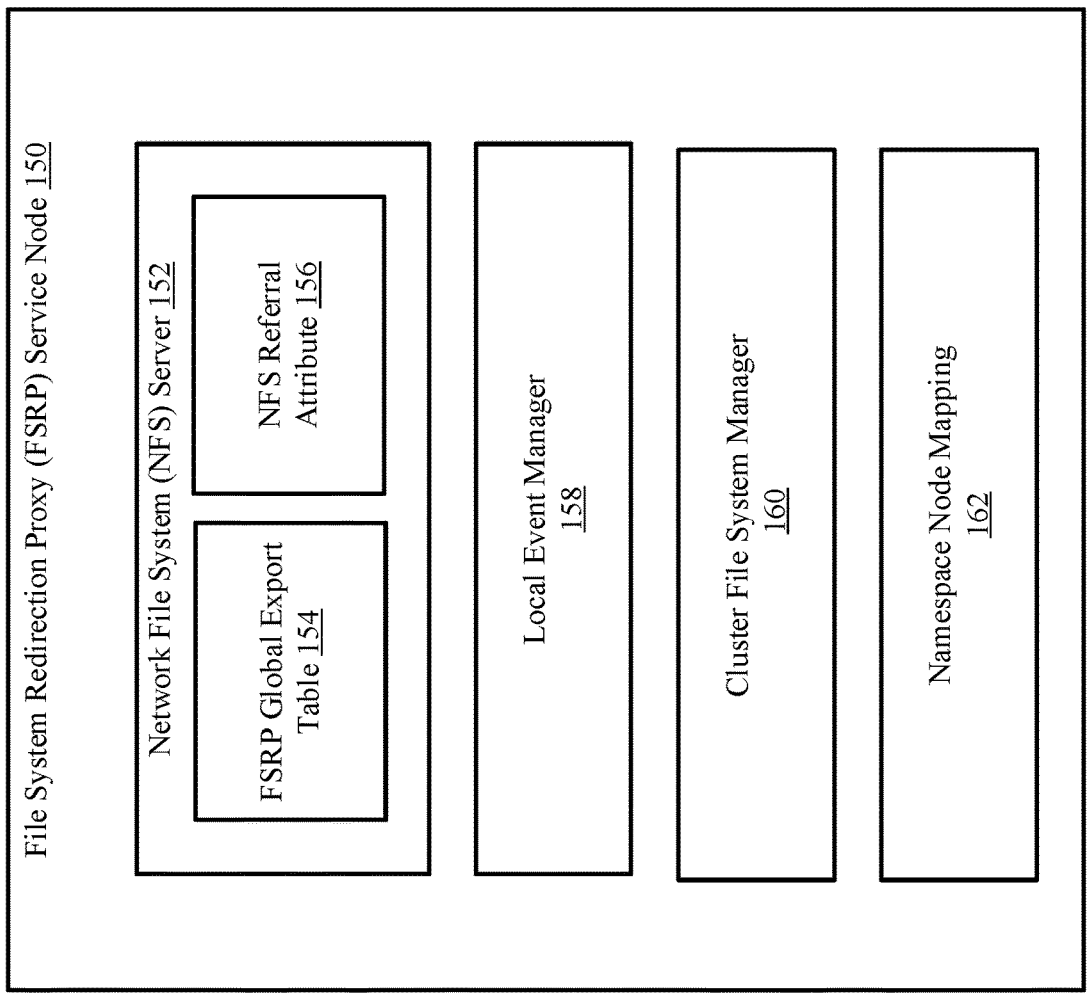
FIG. 1C shows a diagram of a file system redirector proxy (FSRP) node in accordance with one or more embodiments of the invention.

FIG. 1C shows a diagram of the FSRP node. The FSRP node (150) may be an embodiment of an enhanced FSRP node (132, 134, FIG. 1B) discussed above. The FSRP node (150) may include a network file system (NFS) server (152), which may include an FSRP global export table (154) and an NFS referral attribute (156), a local event manager (158), a cluster file system manager (160), and a namespace node mapping (162). The enhanced FSRP node (150) may include additional, fewer, and/or different components without departing from the invention. Each of the aforementioned components of the enhanced FSRP node (150) is discussed below.

In one or more embodiments, the NFS server (152) includes functionality for processing NFS requests. Specifically, the NFS server (152) may obtain NFS requests from NFS Clients and perform a translation of the NFS requests into a format readable to the rest of the cluster nodes in the cluster. The cluster-readable request generated by the NFS server (152) may be provided to the cluster file system manager (154). The NFS server (152) may include an FSRP global export table (154) and an NFS referral attribute.

In one or more embodiments, the FSRP global export table (154) includes functionality to maintain identifiers to easily locate all exports in each of the FSRPs in the cluster server (110). The FSRP global export table (154) is discussed in the description of FIG. 1D. Such identifiers are known as the NFS referral attribute (156). The NFS referral attribute (150) refers to an identifying attribute of the NFS server (152) used by the NFS Client (102) to identify information for accessing the FSRP node (150) and/or the NFS server (152).

In one or more embodiments, the NFS server (152) is implemented as a logical device without departing from the invention. The logical device utilizes computing resources of any number of physical computing devices to provide the functionality of the NFS server (152) described throughout this application.

In one or more embodiments, the local event manager (158) includes the functionality to manage all events happening locally on the FSRP node (150) and communicates directly with the global event manager (112, FIG. 1A) of the cluster (110, FIG. 1A) in order to update the global event manager with any events that may occur on each individual FSRP node. The local event manager (158) may track all active FSRP nodes in the cluster, and whether they are available or unavailable to handle new file system export tasks. The local event manager (158) may assist in the methodology performed in FIG. 2B.

In one or more embodiments, the local event manager (158) is implemented as a logical device without departing from the invention. The logical device utilizes computing resources of any number of physical computing devices to provide the functionality of the local event manager (158) described throughout this application.

In one or more embodiments, the cluster file system manager (160) includes functionality for communicating with other cluster nodes in the cluster to service requests (e.g., cluster-readable requests) based on the file system utilized by the cluster. The cluster file system manager (160) may perform the communication in accordance with FIG. 3B.

In one or more embodiments, the cluster file system manager (160) uses a namespace node mapping (162) to determine the namespace access node (discussed above in FIG. 1B) that is mapped to a file specified in a request. The namespace node mapping (162) may be a data structure that maps each namespace access node in the cluster to the corresponding assigned files of the file system. The cluster file system manager (160) may further update the namespace node mapping (162) based on the new assigning of files in the file system. The namespace node mapping may be used in accordance with, for example, FIG. 3A-3B.

In one or more embodiments, the cluster file system manager (160) is implemented as a logical device without departing from the invention. The logical device utilizes computing resources of any number of physical computing devices to provide the functionality of the cluster file system manager (160) described throughout this application.

Figure 1D:
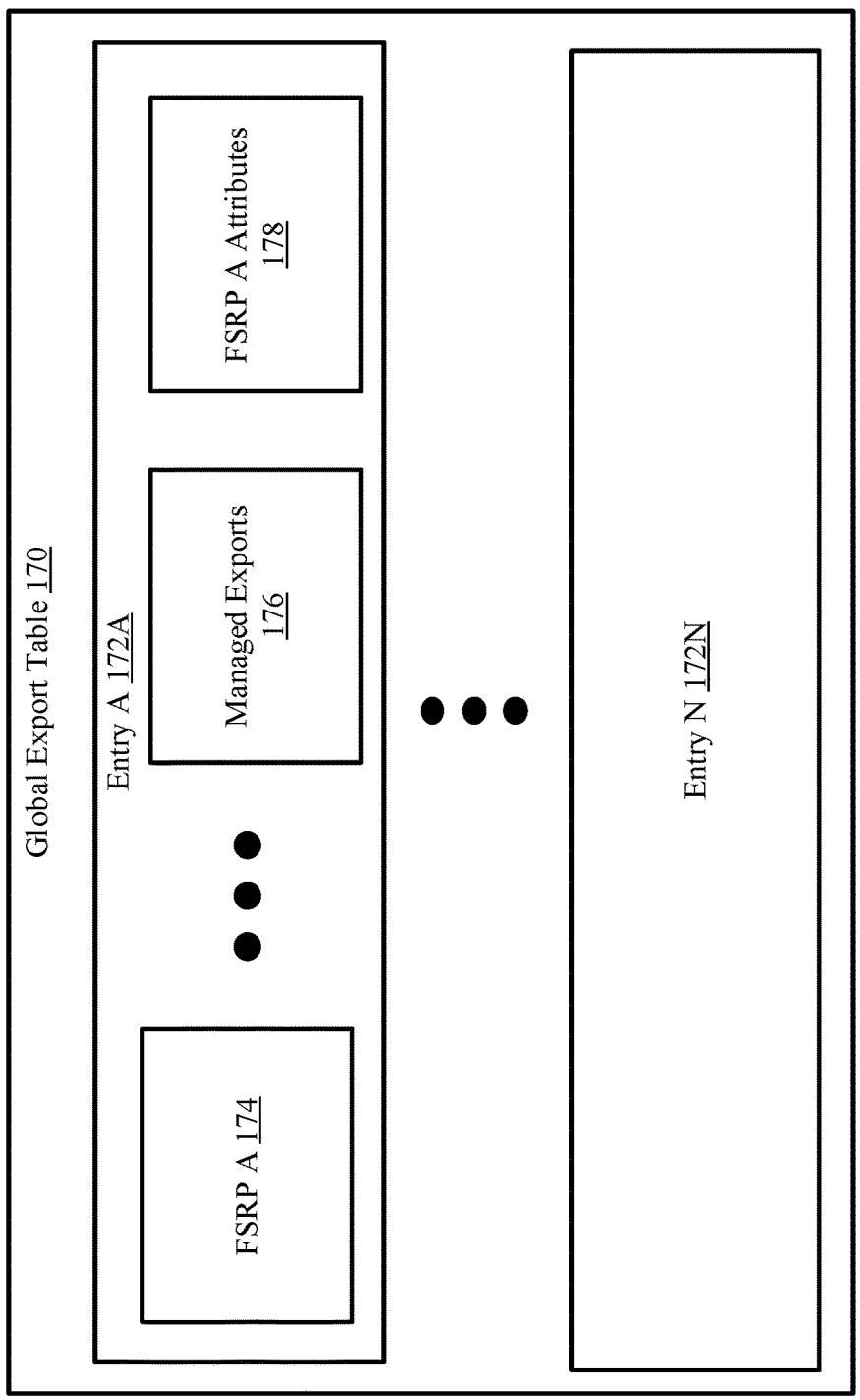
FIG. 1D shows a diagram of a global export table in accordance with one or more embodiments of the invention.

FIG. 1D shows a diagram of the global export table (170). The global export table (170) may be an embodiment of the global export table (154, FIG. 1C) discussed above. As discussed above, the global export table (170) may maintain a list of all FSRP nodes in the cluster. The global export table (170) may include a multitude of entries (172A, 172N) of each instance of a FSRP in the cluster. Each entry may contain information such as the an identifier of the FSRP (174), all managed exports for the FSRP (176), and the attributes of the FSRP (178). The global export table (170) may include additional, fewer, and/or different components or information about the file system export without departing from the invention. Each of the aforementioned components of the global export table (170) is discussed below.

In one or more embodiments, each entry (172A, 172N) represents one instance of a FSRP node in the cluster. Each entry in the global export table (170) includes the FSRP node (174) of the corresponding entry (172A, 172N), the managed exports (176) managed by the FSRP (174), and corresponding FSRP attributes (178). The managed exports (176) specified in an entry (172A, 172N) may be a portion of the namespace managed by the cluster and assigned to the corresponding FSRP (174). The FSRP attributes (178) may specify attributes such as, for example, a domain name associated with the FSRP (174), an internet protocol (IP) address used to communicate with the FSRP (174), and/or other attributes without departing from the invention.

Figure 2A:
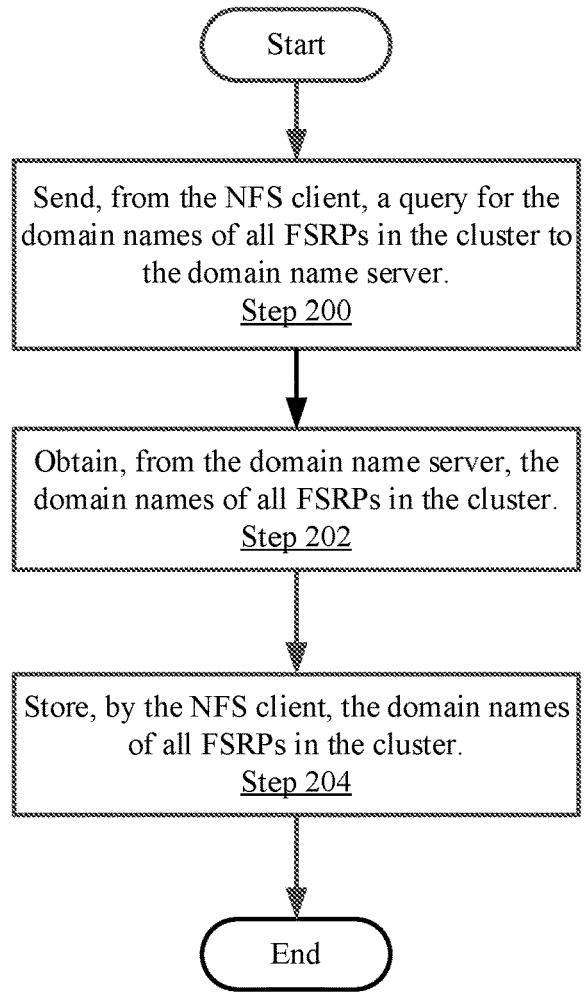
FIG. 2A shows a flowchart of a method for obtaining the domain names of the FSRPs in the cluster in accordance with one or more embodiments of the invention.
Figure 2B:
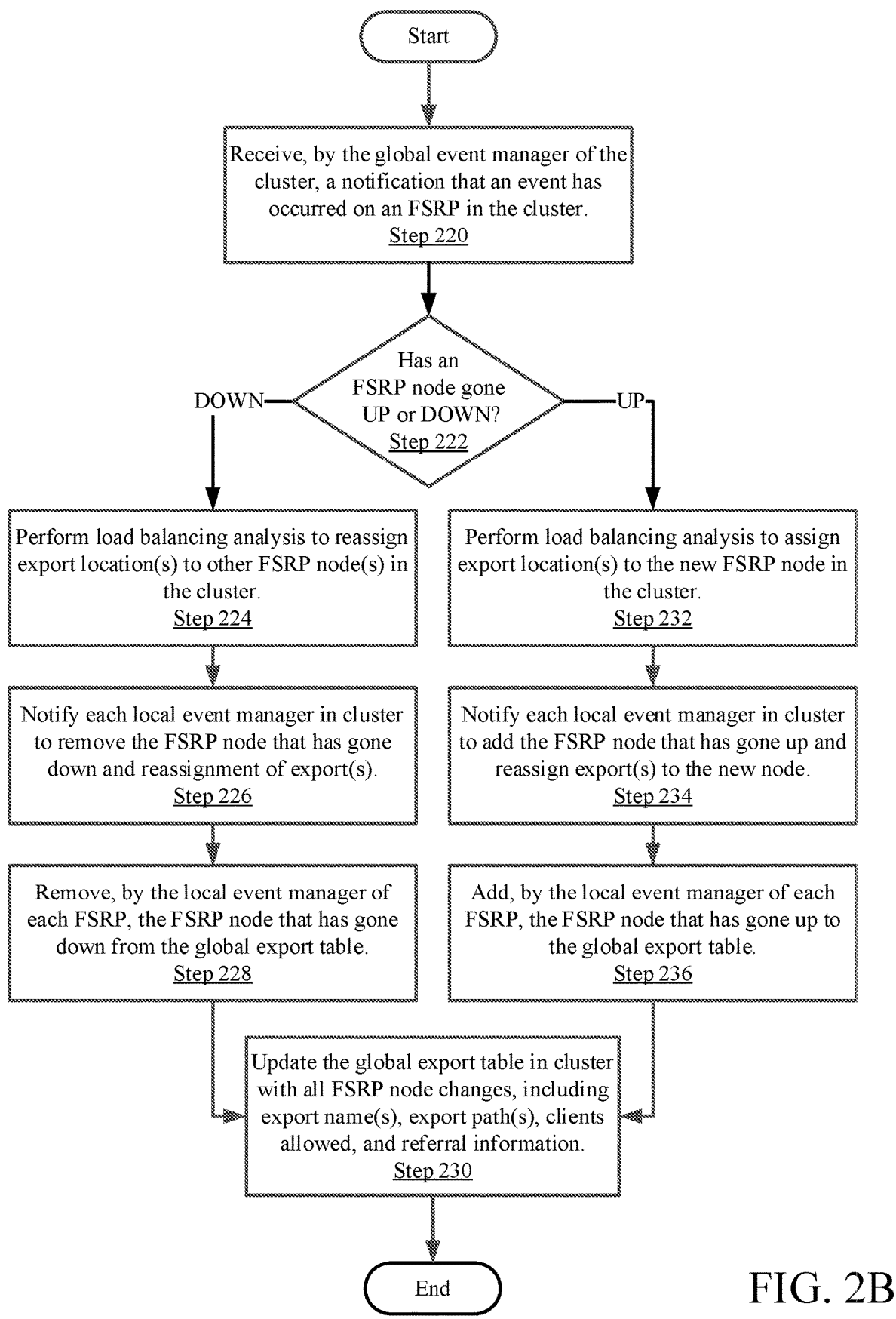
FIG. 2B shows a flowchart of a method for updating the global export tables of the FSRPs in accordance with one or more embodiments of the invention.

FIG. 2A shows a flowchart of a method for obtaining the domain names of all FSRP nodes in the cluster in accordance with one or more embodiments of the invention. The method may be performed by, for example, an NFS Client (102) and the domain name server (DNS) (104). Other components of the system illustrated in FIGS. 1A-1D may perform all, or a portion, of the method of FIG. 2A without departing from the invention.

While FIG. 2A is illustrated as a series of steps, any of the steps may be omitted, performed in a different order, include additional steps, and/or perform any or all of the steps in a parallel and/or partially overlapping manner without departing from the invention.

In Step 200, a query for the domain names of all FSRP nodes in the cluster is sent from the NFS Client to the DNS. In one or more embodiments, the NFS Client may be querying for individual or multiple domain names for the FSRP nodes.

In Step 202, the domain names of all FSRPs in the cluster are obtained by the NFS Client from the DNS. For example, the domain name of FSRP node 1 may be given to the NFS Client in the form of "fsrp1.domain.com". The domain names of the FSRP nodes will be obtained in list form including all available FSRP nodes on the cluster.

In Step 204, the domain names obtained from the domain name server are stored by the NFS Client. The domain names of all FSRP nodes on the cluster may be stored on, but is not limited to, the FSRP global export table in the NFS server client (see FIG. 1C, 152, 156).

The NFS Client may further store any export locations obtained from the FSRP nodes. For example, the NFS Client may request NFS referral attributes for a given export and obtain a response that specifies the export and the FSRP managing the given export. This information may be tracked by the NFS Client by, for example, mounting the export and storing the relevant information to access the export.

FIG. 2B shows a flowchart of a method for globally mapping all FSRP nodes in the cluster in accordance with one or more embodiments of the invention. The method may be performed by, for example, the global and local event managers (112, FIG. 1A, and 158, FIG. 1C). Other components of the system illustrated in FIGS. 1A-1D may perform all, or a portion, of the method of FIG. 2B without departing from the invention.

While FIG. 2B is illustrated as a series of steps, any of the steps may be omitted or performed in a different order including additional steps, and/or perform any or all of the steps in a parallel and/or partially overlapping manner without departing from the invention.

In Step 220, a notification is received by the global event manager on the cluster that an event has occurred on an FSRP node in the cluster. This event may include an FSRP node going "UP" or "DOWN," as described above.

In Step 222, a determination is made about whether the event notification that was received by the global event manager was for an FSRP node going UP or DOWN. If the notification indicates that an FSRP node has gone DOWN, the method proceeds to Step 224; if the notification indicates that an FSRP node has gone UP, the method proceeds to Step 232.

In Step 224, following the determination that one of the FSRP nodes has gone DOWN, load balancing analysis is performed in order to reassign one or more export locations to different FSRP nodes in the cluster. The load balancing analysis may be based on either a client workload. In one or more embodiments, the client workload refers to a rate of NFS requests issued by clients to a given FSRP node. The load balancing analysis may include assigning the export locations(s) to a FSRP node that has the lowest relative client workload. Alternatively, the load balancing analysis may be based on current export workload. In one or more embodiments, the current export workload of a FSRP node may refer to a number of exports managed by the FSRP node. The load balancing analysis may include assigning the export location(s) to a FSRP node that manages the lowest number of exports. The load balancing analysis may further include distributing the export locations of the DOWN FSRP node to multiple other FSRP nodes without departing from the invention.

In Step 226, each local event manager for each FSRP node in the cluster is notified about the FSRP node that has gone DOWN and is instructed to remove a corresponding entry from its global export table. Each local event manager is also notified about the reassignment of the file system export(s).

In Step 228, the FSRP node that has gone DOWN is removed from the global export table by the local manager of each FSRP. The FSRP node that went DOWN will no longer be present in the global export table, and file system exports will not be sent to it. The method proceeds to Step 230.

In Step 230, the global export table in the cluster is fully updated with all FSRP node changes, including the changes to one or more export names, export paths, the clients that are allowed for each of the exports, and referral information about the exports. More information on these details can be found in the discussion of the global export table in FIG. 1D. The methodology ends after this step.

In Step 232, following the determination that the FSRP node has gone UP, a load balancing analysis is performed in order to assign one or more export locations to the new FSRP node in the cluster. The load balancing analysis may result in a redistribution of export assignments in the FSRP nodes based on either the client workloads or the current export workloads of all FSRP nodes.

In Step 226, each local event manager for each FSRP node in the cluster is notified about the FSRP node that has gone UP and is instructed to generate a corresponding entry in the global export table. Each local event manager is also notified about the reassignment of the single or multiple file system exports to the new FSRP node.

Turning to Step 228, the FSRP node that has gone UP is added to the global export table by the local manager of each FSRP. The FSRP node that went UP will now be present in the global export table, and file system exports will be sent to it. The method proceeds to Step 230.

Figure 3A:
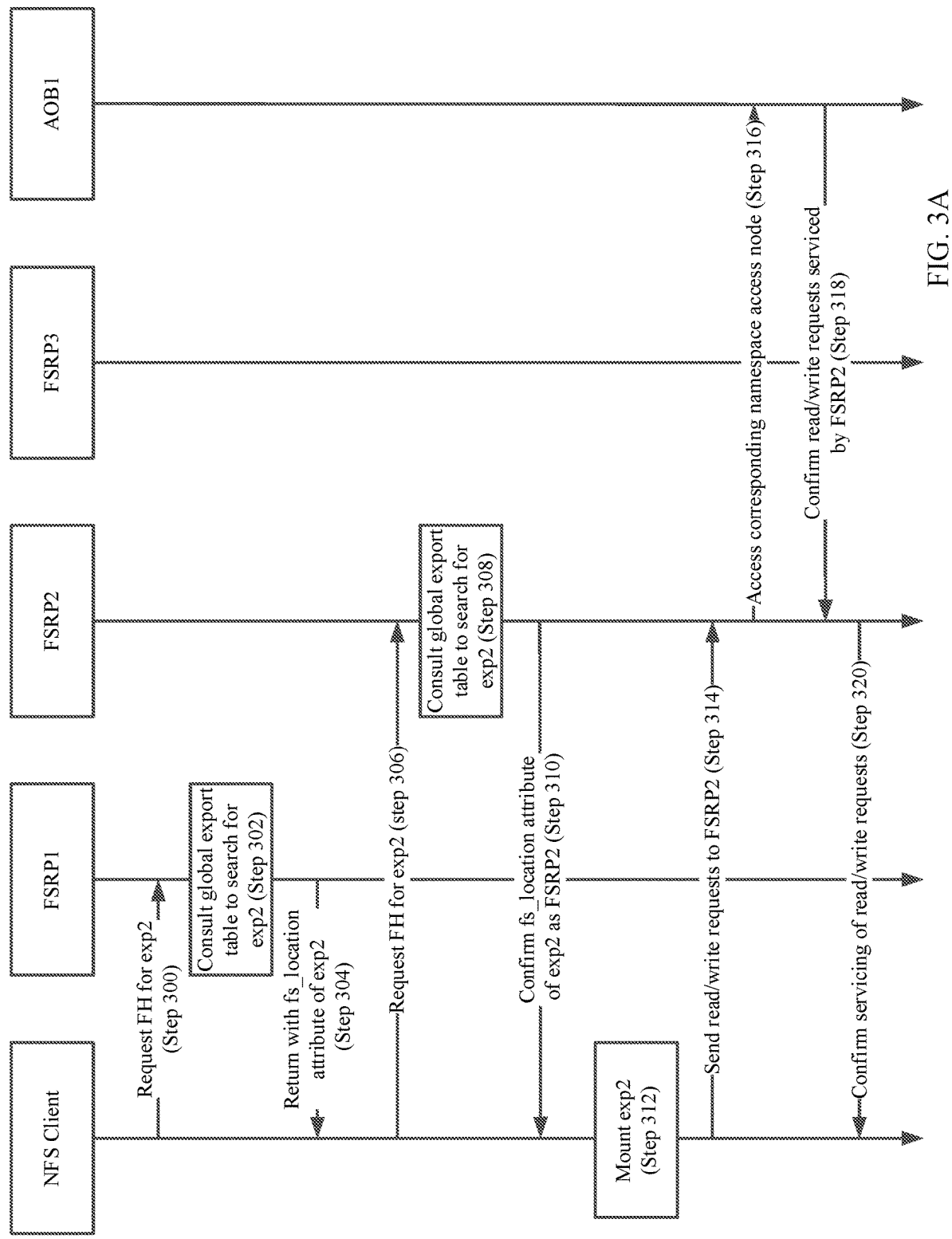
FIG. 3A shows a method for load balancing exports in accordance with one or more embodiments of the invention.

FIG. 3A shows a vertical flowchart of a method for load balancing FSRP nodes in the cluster in accordance with one or more embodiments of the invention. The method may be performed by, for example, the NFS Client and any number of FSRP nodes (102, FIG. 1A, and 150, FIG. 1C). Other components of the system illustrated in FIGS. 1A-1D may perform all, or a portion, of the method of FIG. 3A without departing from the invention.

While FIG. 3A is illustrated as a series of steps, any of the steps may be omitted or performed in a different order including additional steps, and/or perform any or all of the steps in a parallel and/or partially overlapping manner without departing from the invention. For the purposes of the descriptions of FIGS. 3A-3C, any communications between the NFS Clients and the FSRP nodes are in accordance with NFS protocol.

In Step 300, the client requests the file handle (FH) for a specific file system export, exp2, from FSRP1. For the purpose of the description of FIG. 3A, export2 is specified in an entry of a global export table (not shown) of FSRP1 as being associated with (e.g., managed by), "FSRP2."

In Step 302, FSRP1 consults its global export table in order to search for file system export 2, or "exp2." The global export table (see FIG. 1D) may include a list of all managed exports and attributes of the FSRP nodes that managed the file system exports. The global export table may also include any other information obtained from the domain name server.

In Step 304, FSRP1 returns the file system location attribute of exp2 from its global export table. In this description, the location attribute for exp2 points to FSRP2. Given FSRP2 is the correct location for export2, the NFS Client uses the obtained location attribute (i.e., the IP address of FSRP2) for export2 to initiate communication with FSRP2.

In Step 306, the NFS Client requests the file handle for the file system export exp2 from FSRP2. This request may include a request for confirmation that export2 may be obtained via the NFS server of FSRP2.

In Step 308, FSRP2 consults its global export table to determine that exp2 is managed by FSRP2.

In Step 310, FSRP2 sends a confirmation to the NFS Client that exp2 may be accessed via FSRP2.

In Step 312, based on receiving the confirmation of Step 310, the NFS Client mounts exp2. The mounting results in the NFS Client storing the relevant information that maps exp2 and the IP address of FSRP2.

In Step 314, the NFS Client sends read and write requests for exp2 (such as writing new files to exp2).

In Step 316, FSRP2 accesses the corresponding namespace access node to read from and write to exp2 (and any corresponding files within).

In Step 318, the namespace access node confirms servicing of the read/write request to the FSRP node in the cluster-readable protocol.

In Step 320, the confirmation of the servicing is provided to the NFS Client by FSRP2 and in accordance with the NFS protocol.

To further describe Steps 312-314, an Example section is provided below.

EXAMPLE

Figure 3B:
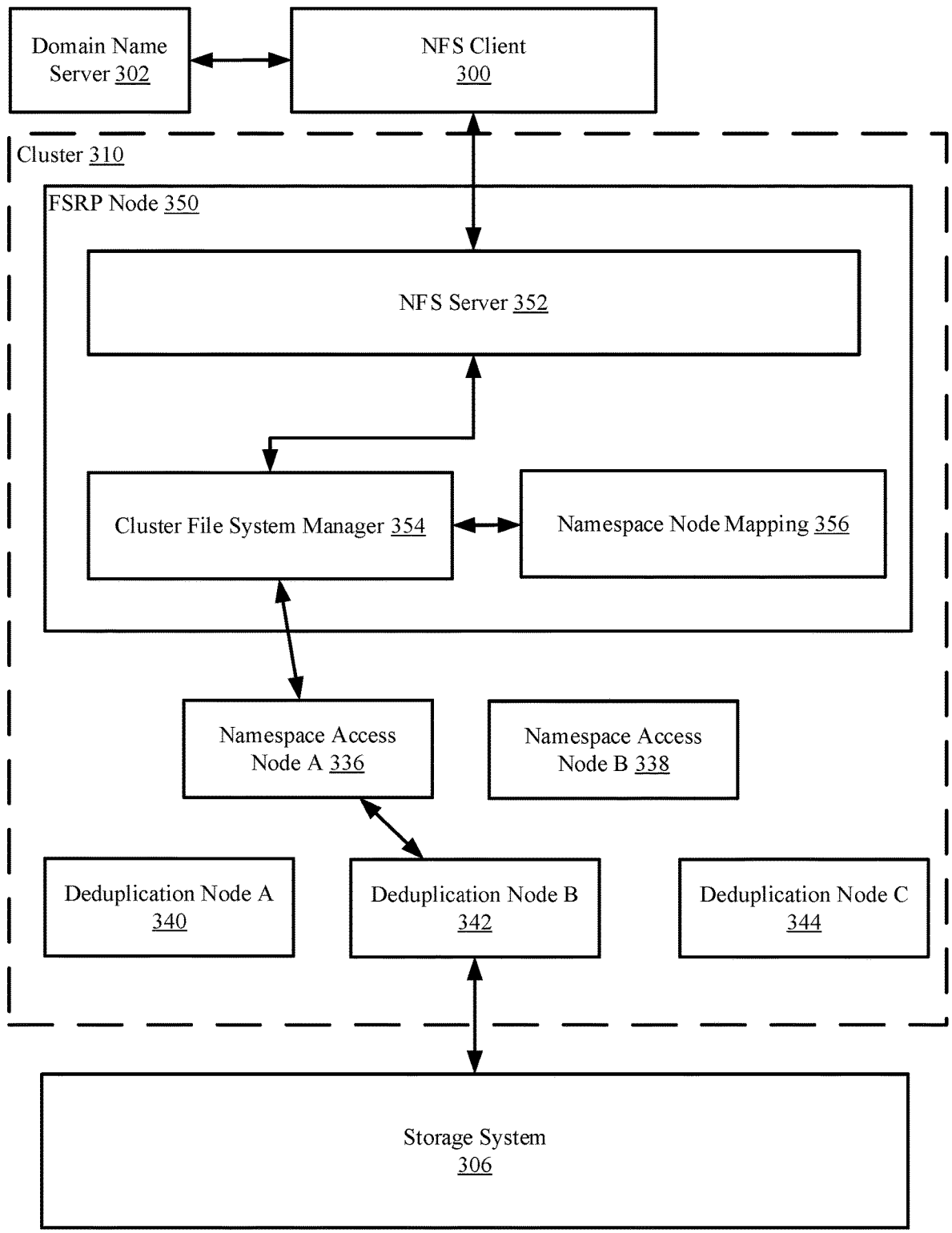
FIG. 3B shows an example of a file system storage process in accordance with one or more embodiments of the invention.

The following section describes an example. The example, illustrated in FIG. 3B, is not intended to limit the invention. Turning to the example, consider a scenario in which a NFS Client utilizes a scalable cluster to perform file system storage services for a NFS. In the below example, FSRP node (350) is FSPR2 of FIG. 3A.

Turning to FIG. 3B, FIG. 3B shows a diagram of an example system. For the sake of brevity, not all components of the example system are illustrated in FIG. 3B. The example system includes at least a NFS Client (300), a domain name server (302), a cluster (310), and a storage system (306). The NFS Client (300) utilizes the cluster (310) for file system storage services such as storing and providing data of the NFS to the NFS Client. The cluster includes an enhanced file system redirector proxy (FSRP) node (350), two namespace access nodes (336, 338), and three deduplication nodes (340, 342, 344).

The NFS Client (300) mounts a NFS directory "/data/col1/exp2" (also referred to as "exp2" in FIG. 3A and "the directory" in this example) in accordance with FIG. 3A. The NFS Client (300) communicates with a NFS server (352) of the enhanced FSRP node (350) to send NFS requests for reading, writing, and/or otherwise using files in the directory.

For example, the NFS Client (300) may send two NFS requests for two new files (i.e., file1 and file2) to the directory. The NFS server (352) translates each of the two NFS requests into cluster-readable requests. The two cluster-readable requests are provided to a cluster file manager (354) of the FSRP node (350).

The cluster file system manager (354) consults with the namespace node mapping (356) to determine that the two files are not currently managed in the cluster. The two files may be assigned to one of the namespace access nodes (336) in accordance with the availability of the two namespace access nodes (336, 338). Based on such availability, the cluster file system manager (354) assigns namespace access node A (336) to manage the two files. Based on this assignment, the cluster file system manager (354) updates a namespace node mapping (356) to specify the mapping of namespace access node A (336) to file1 and file2.

The cluster file system manager (354), following this assignment, serves as a client for the storage of the data of file1 and file2, and communicates with deduplication node B (342) to request it to store the two files in the storage system (306). Deduplication node B (342) performs deduplication services such as hashing the data of file1 to obtain a first unique hash value, determining that the first unique hash value is not stored in a local mapping (not shown) of the deduplication nodes (340, 342, 344), and based on this determination, sends the data to the storage system (306) for storage. Similarly, deduplication node B (342) hashes the data of file2 to obtain a second unique hash value. Deduplication node B (342) determines that the second unique hash value is not specified in the local mappings, and based on this determination, sending the data to the storage system (306) for storage.

The deduplication node B (342) sends confirmation of the storage to the namespace access node A (336), which forwards such confirmation to the cluster file system manager (354). The NFS server (352) obtains this confirmation and provides the confirmation to the NFS Client (300).

End of Example

Figure 3C:
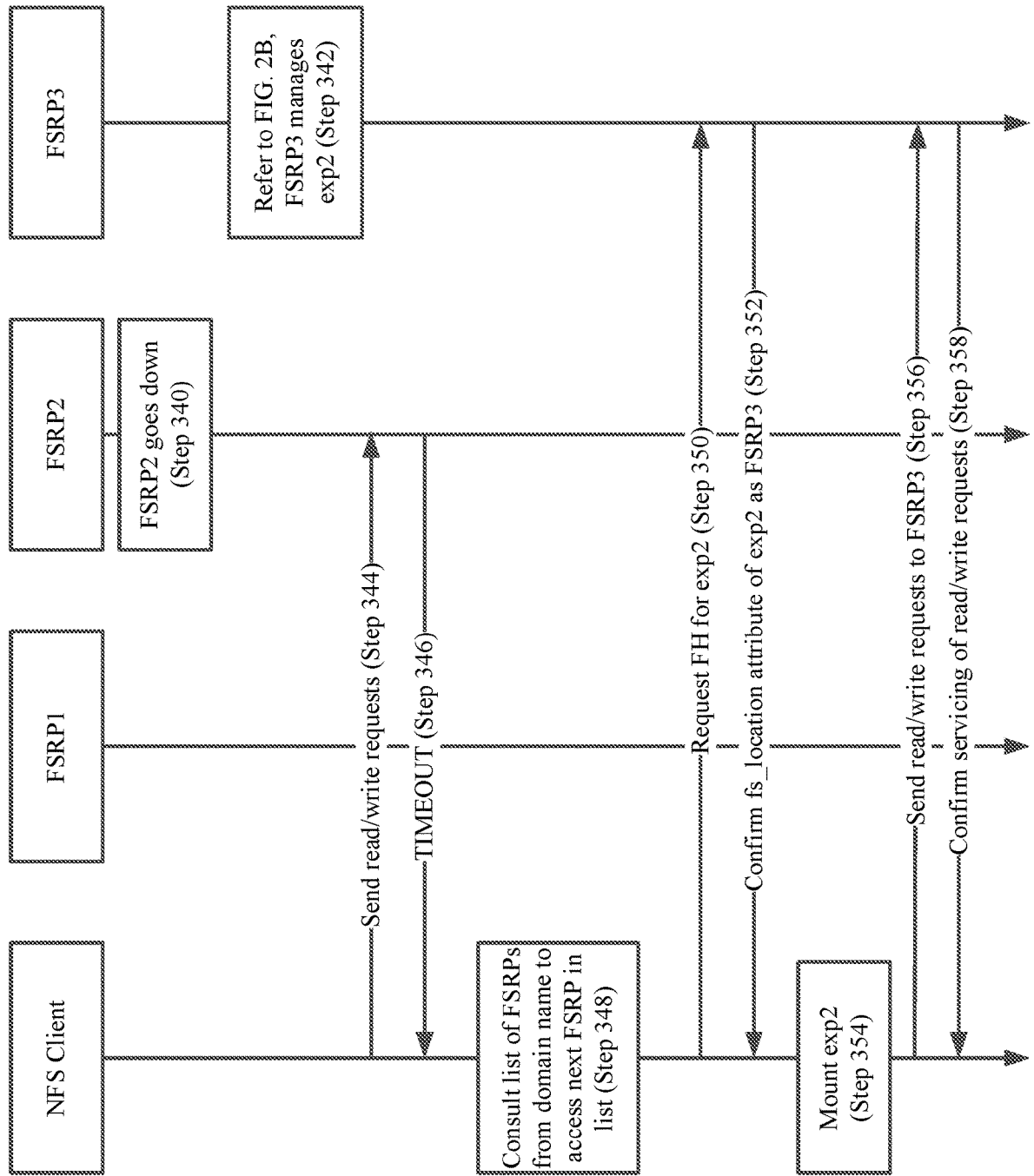
FIG. 3C shows an example of a failure instance in accordance with one or more embodiments of the invention.

FIG. 3C shows a vertical flowchart of an example of a failure instance of an FSRP node in the cluster in accordance with one or more embodiments of the invention. The method may be performed by, for example, the NFS Client and any number of FSRP nodes (102, FIG. 1A, and 150, FIG. 1C). Other components of the system illustrated in FIGS. 1A-1D may perform all, or a portion, of the method of FIG. 3A without departing from the invention.

While FIG. 3C is illustrated as a series of steps, any of the steps may be omitted or performed in a different order including additional steps, and/or perform any or all of the steps in a parallel and/or partially overlapping manner without departing from the invention.

In step 340, an event occurs which results in FSRP2 becoming unavailable, or going "DOWN." This may be due to a system failure, scheduled maintenance, or too heavy of a workload for the FSRP2 node to manage. The local event manager of FSRP2 reports this instance to the global event manager in order for all FSRP nodes on the cluster to update their corresponding global export tables. FSRP2 is no longer available, and the load that previously existed on FSRP2 is redistributed across other FSRP nodes that are available on the cluster. The global export table for the cluster is updated accordingly with the aftermath of this event, including the location of reassigned file system exports. For more information on this process, please refer to FIG. 2B.

In Step 342, based on the methodology conducted in FIG. 2B for redistributing workloads in the event of an FSRP node going down, the workload of FSRP2 is reassigned to FSRP3. In one or more embodiments of this invention, the workload of an individual FSRP node (e.g., multiple exports) may be redistributed across multiple FSRP nodes. In the description of FIG. 3A, only the reassignment of export 2 is described. As described in FIG. 2B, the reassignment may be in accordance with relative current export workload of FSRP1 and FSRP3 and client workload of each of FSRP1 and FSRP3.

In Step 344, the NFS Client attempts to send the read/write requests described above in FIG. 3B to FSRP2, which has gone down. However, it is not possible for an FSRP node that has gone down to service NFS requests from an NFS Client.

In Step 346, the NFS Client receives a TIMEOUT notification which confirms that FSRP2 is unavailable as a file system export location.

In Step 348, based on the TIMEOUT notification, the NFS Client consults the list of all FSRP nodes in the cluster from the domain name server in order to identify which FSRP is next on the list to attempt to access exp2. In this example, the next FSRP in the list is FSRP3.

In Step 350, the NFS Client requests the file handle for the file system export exp2 from FSRP3. Based on the process conducted in Step 342, the file handle for exp2 is now accessible via FSRP3.

In Step 352, FSRP2 consults its global export table in order to search for file system, exp2. The global export table of FSRP3 includes the file system location attribute for exp2, therefore confirming its location on FSRP3. FSRP3 confirms to the NFS Client that exp2 is accessible on FSRP3, in contrast to its original location, the now-unavailable FSRP2.

In Step 354, the NFS Client mounts exp2 using the updated file system location attribute. The mounting results in the NFS Client storing the relevant information that maps exp2 to the IP address of FSRP2.

In Steps 356 and 358, the NFS Client utilizes FSRP3 to service read/write requests for exp2.

As discussed above, embodiments of the invention may be implemented using computing devices. Turning now to FIG. 4, FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth® interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many diverse types of computing devices exist, and the aforementioned input and output device(s) may take other forms.

One or more embodiments of the invention may be implemented using instructions executed by one or more processors of the cluster manager. Further, such instructions may correspond to computer readable instructions that are stored on one or more non-transitory computer readable mediums.

One or more embodiments of the invention may improve the operation of one or more computing devices in a cluster environment. Specifically, embodiments of the invention relate to a method of providing file system storage services across a network using, for example, a network file system protocol.

One or more embodiments of the invention relates to a method of leveraging existing cluster technology and their existing protocols to provide the file system storage services using NFS protocols by clients. With this technology, no additional software may be required on the NFS Clients in response to the addition, removal, or otherwise scaling of cluster nodes in the cluster. Further, no change in protocol is required within the nodes in the deduplication-aware cluster. In this manner, data transfer services are provided by the cluster to clients operating using a NFS protocol despite the cluster operating in a different protocol such as DDBoost™. The NFS Clients may remain agnostic to changes in the cluster, thus improving the user experience when using the deduplication-aware cluster to manage its data storage.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing data in a cluster, the method comprising:
   receiving, by a global event manager of the cluster, a notification that an event has occurred on the cluster, wherein the cluster comprises a plurality of file system redirector proxy (FSRP) nodes,
   wherein the event indicates that a change in the plurality of FSRP nodes operating in the cluster;
   in response to the notification:
   performing a load balancing analysis on the cluster to assign an export location of a file system export to a FSRP node of the plurality of FSRP nodes based on the change;
   notifying each of the plurality of FSRP nodes in the cluster of the change and of the assigning;
   updating a global export table based on the assigning of the export location to the FSRP node and based on the change,
   wherein the notifying results in an update of a global export table of each of the plurality of FSRP nodes of the assigning of the export location to the FSRP node,
   wherein prior to the notifying the export location was assigned to another one of the plurality of FSRP nodes, and
   wherein the global export table is used to manage access to the file system export in the cluster by a client; and
   exporting, by a cluster server of the cluster, a portion of the data associated with the file system, wherein the file system export comprises a portion of the data associated with the file system.

2. The method of claim 1, wherein the file system export is in a format readable in a network file system (NFS) protocol.

3. The method of claim 2, wherein the client manages a namespace in the NFS protocol, wherein the cluster manages a namespace in a protocol different from the NFS protocol, and wherein the client accesses the file system export using the plurality of FSRP nodes in the cluster.

4. The method of claim 3, wherein the client communicates with a domain name server (DNS) to obtain a list of domain names of each of the plurality of FSRP nodes.

5. The method of claim 4, wherein the client, after the notifying, communicates with one of the plurality of FSRP nodes, using the list of domain names, to obtain attribute information associated with the file system export, and wherein the attribute information comprises the export location and a domain name of the FSRP node.

6. The method of claim 1,
   wherein the event corresponds to a second FSRP node becoming unavailable,
   wherein the method further comprises:
   determining, prior to the load balancing analysis, that the file system export was assigned to the second FSRP node prior to becoming unavailable, and
   based on the determining and after performing the load balancing analysis, instructing each FSRP node in the cluster to remove the second FSRP node from the global export table.

7. The method of claim 1,
   wherein the event corresponds to the FSRP node is introduced to the cluster.

8. The method of claim 1, wherein the load balancing analysis is based on current export workload on each of the plurality of FSRP nodes.

9. The method of claim 1, wherein the load balancing analysis is based on client workload on each of the plurality of FSRP nodes.

10. A system comprising:
   a cluster comprising a plurality of file system redirector proxy (FSRP) nodes and a global event manager executing on a processor,
   wherein the global event manager is programmed to:
   receive, by a global event manager of the cluster, a notification that an event has occurred on the cluster, wherein the cluster comprises a plurality of FSRP nodes,
   wherein the event indicates that a change in the plurality of FSRP nodes operating in the cluster;

in response to the notification:

perform a load balancing analysis on the cluster to assign an export location of a file system export to a FSRP node of the plurality of FSRP nodes based on the change;

notify each of the plurality of FSRP nodes in the cluster of the change and of the assigning;

updating a global export table based on the assigning of the export location to the FSRP node and based on the change, wherein the notifying results in an update of a global export table of each of the plurality of FSRP nodes of the assigning of the export location to the FSRP node, wherein prior to the notifying the export location was assigned to another one of the plurality of FSRP nodes, and wherein the global export table is used to manage access to the file system export in the cluster by a client; and exporting, by a cluster server of the cluster, a portion of the data associated with the file system, wherein the file system export comprises a portion of the data associated with the file system.

11. The system of claim 10, wherein the file system export is in a format readable in a NFS protocol.

12. The system of claim 11, wherein the client manages a namespace in the NFS protocol, wherein the cluster manages a namespace in a protocol different from the NFS protocol, and wherein the client accesses the file system export using the plurality of FSRP nodes in the cluster.

13. The system of claim 12, wherein the client communicates with a DNS to obtain a list of domain names of each of the plurality of FSRP nodes.

14. The system of claim 13, wherein the client, after the notifying, communicates with one of the plurality of FSRP nodes, using the list of domain names, to obtain attribute information associated with the file system export, and wherein the attribute information comprises the export location and a domain name of the FSRP node.

15. The system of claim 10, wherein the event corresponds to the FSRP node becoming unavailable, wherein the global event manager is further programmed to:

determine, prior to the load balancing analysis, that the file system export was assigned to the FSRP node prior to becoming unavailable, and based on the determining and after performing the load balancing analysis, instruct each FSRP node in the cluster to remove the FSRP node from the global export table.

16. The system of claim 10, wherein the event corresponds to the FSRP node is introduced to the cluster.

17. The system of claim 10, wherein the load balancing analysis is based on current export workload on each of the plurality of FSRP nodes.

18. The system of claim 10, wherein the load balancing analysis is based on client workload on each of the plurality of FSRP nodes.

19. A non-transitory computer readable medium comprising computer readable program code, which when executed by a computer processor enables the computer processor to perform a method for managing data in a cluster, the method comprising:

receiving, by a global event manager of the cluster, a notification that an event has occurred on the cluster, wherein the cluster comprises a plurality of file system redirector proxy (FSRP) nodes, wherein the event indicates that a change in the plurality of FSRP nodes operating in the cluster;

in response to the notification:

performing a load balancing analysis on the cluster to assign an export location of a file system export to a FSRP node of the plurality of FSRP nodes based on the change;

notifying each of the plurality of FSRP nodes in the cluster of the change and of the assigning;

updating a global export table based on the assigning of the export location to the FSRP node and based on the change, wherein the notifying results in an update of a global export table of each of the plurality of FSRP nodes of the assigning of the export location to the FSRP node, wherein prior to the notifying the export location was assigned to another one of the plurality of FSRP nodes, and wherein the global export table is used to manage access to the file system export in the cluster by a client; and exporting, by a cluster server of the cluster, a portion of the data associated with the file system, wherein the file system export comprises a portion of the data associated with the file system.

20. The non-transitory computer readable medium of claim 19, wherein the file system export is in a format readable in a NFS protocol, wherein a client manages a namespace in the NFS protocol, wherein the cluster manages a namespace in a protocol different from the NFS protocol, and wherein the client accesses the file system export using the plurality of FSRP nodes in the cluster, wherein the client communicates with a DNS to obtain a list of domain names of each of the plurality of FSRP nodes, and wherein the client, after the notifying, communicates with one of the plurality of FSRP nodes, using the list of domain names, to obtain attribute information associated with the file system export, and wherein the attribute information comprises the export location and a domain name of the FSRP node.

* * * * *